United States Patent
Yim et al.

(10) Patent No.: US 7,451,464 B2
(45) Date of Patent: Nov. 11, 2008

(54) DISK PLAYER HAVING DAMPING UNIT FOR LIFTING UNIT

(75) Inventors: Hong-kyun Yim, Suwon-si (KR);
Yong-hoon Lee, Suwon-si (KR);
Jae-yong Eum, Suwon-si (KR);
Jeung-rak Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 398 days.

(21) Appl. No.: 11/320,320

(22) Filed: Dec. 29, 2005

(65) Prior Publication Data

US 2006/0161933 A1    Jul. 20, 2006

(30) Foreign Application Priority Data

Jan. 19, 2005    (KR) .................. 10-2005-0004990

(51) Int. Cl.
*G11B 17/03*    (2006.01)
(52) U.S. Cl. ...................................... 720/605
(58) Field of Classification Search ............... 720/605, 720/611
See application file for complete search history.

(56) References Cited

U.S. PATENT DOCUMENTS

| | | | | |
|---|---|---|---|---|
| 4,654,840 A * | 3/1987 | Takahashi | ................ | 720/605 |
| 5,726,967 A * | 3/1998 | Tanaka et al. | ............ | 369/30.78 |
| 6,169,720 B1 * | 1/2001 | Kamemura et al. | ......... | 720/605 |
| 6,944,872 B2 * | 9/2005 | Moriyama et al. | .......... | 720/690 |

FOREIGN PATENT DOCUMENTS

| | | |
|---|---|---|
| JP | 2003-100007 | 4/2003 |
| KR | 1019960013008 | 9/1996 |
| KR | 1998-011267 | 5/1998 |
| KR | 1998-023450 | 7/1999 |
| KR | 1999-023451 | 7/1999 |

* cited by examiner

*Primary Examiner*—David D Davis
(74) *Attorney, Agent, or Firm*—Roylance, Abrams, Berdo & Goodman, L.L.P.

(57) ABSTRACT

A disk player has a tray capable of moving in and out of a player body. A driving unit moves the tray. A lift unit selectively engages or disengages the driving unit and raises a turntable receiving a disk loaded by the tray thereon. A spindle motor rotates the turntable. A damping unit reduces loads and impacts during movement of the lift unit.

9 Claims, 6 Drawing Sheets

DISK PLAYER HAVING DAMPING UNIT FOR LIFTING UNIT

CROSS-REFERENCE TO RELATED APPLICATIONS

This application claims the benefit under 35 U.S.C. § 119(a) of Korean Patent Application No. 2005-4990 filed on Jan. 19, 2005, in the Korean Intellectual Property Office, the entire disclosure of which is hereby incorporated by reference.

BACKGROUND OF THE INVENTION

1. Field of the Invention

The present invention relates to a disk player. More particularly, the present invention relates to a disk player that smoothly loads and unloads disks while reducing loads and impacts associated with movement of the lifting unit.

2. Description of the Related Art

Generally, a disk player records and reproduces information on a disk such as an optical disk. Examples of disk players include CD-ROM drivers, video disk apparatuses, digital audio disk apparatuses, and DVD players.

The disk player has therein a disk tray moving in and out of the body. The disk tray has a receiving part for receiving a disk or a disk cartridge. A lower portion of the disk tray has a rack gear spaced a certain distance in a direction of loading.

The rack gear is engaged with a tray gear in the body to move in a direction of loading or unloading according to a driving direction of a driving motor.

The body includes a turntable seating in the tray for receiving a loaded disk, a chucking unit for chucking the disk seated in the turntable, a spindle motor for rotating both the turntable and the disk, and an optical pick up for recording and reproducing information on the rotating disk.

The chucking unit is fixed at an upper portion of the body. A lift unit raises the turntable, the spindle motor, and the optical pick up to chuck the loaded disk between the turntable and the chucking unit.

The lift unit includes a lift plate liftable in the body, and a cam slider that slides in the body to move a lift lever. The cam slider has a rack gear selectively engaged with a driving gear rotated by power of the driving motor. The cam slider moves by interference of the disk tray during loading of the disk such that the rack gear of the cam slider moves in connection with the driving gear. Accordingly, the lift plate can ascend in association with the cam slider. When unloading the disk tray, an opposite order of the above process is made to lower the lift plate.

The lift plate is heavy due to having many elements, such as the spindle motor, the turn table, and the optical pick-up. A large load is exerted when raising the heavy lift plate, and noise is generated due to sudden descending.

Accordingly, a need exists for an improved disk player that reduces loads and impacts during movement of the lifting unit.

SUMMARY OF THE INVENTION

An aspect of the present invention is to provide a disk player with an improved structure that smoothly performs loading and unloading of a disk.

A disk player includes a tray capable of moving in and out of a player body, a driving unit moving the tray, a lifting unit selectively engaged or disengaged with the driving unit and raising a turntable that receives a disk loaded by the tray and a spindle motor rotating the turntable, and a damping unit reducing a load and impact during movement of the lifting unit.

The driving unit includes a first rack gear formed at a lower portion of the tray, a tray gear rotatably formed in the player body to engage the first rack gear, and a driving motor for driving the tray gear.

The lifting unit may include a pivot plate supporting the spindle motor and the turntable and rotatably formed in the player body, a cam slider provided in the player body for reciprocal sliding movement that causes the pivot plate to ascend or descend according to a direction of movement thereof, a driving gear formed in the player body to rotate by power of the driving motor, and a second rack gear formed in the cam slider and engaged and disengaged with the driving gear according to the position of the cam slider.

The cam slider may move in association with the tray so that the second rack gear and the driving gear may be engaged and disengaged with each other.

The cam slider may have at a top surface an interference protrusion, and the tray may have a cam rail for guiding the interference protrusion to be driven.

The pivot plate may have one or more cam protrusions, and the cam slider may have a cam slit in which the cam protrusions are received in and are guided along.

The tray gear and the driving gear may be coaxially formed.

The damping unit may include an elastic member connected with the lifting unit.

The elastic member may connect the lifting unit and the player body to provide the lifting unit with an elastic support in the raising direction, and a reaction force for descending.

The damping unit may include an elastic member urging the cam slider in a moving direction of the cam slider corresponding to a raising direction of the pivot plate.

The elastic member may include a coiled spring.

Other objects, advantages and salient features of the present invention will become apparent from the following detailed description, which, taken in conjunction with the annexed drawings, discloses exemplary embodiments of the present invention.

BRIEF DESCRIPTION OF THE DRAWINGS

The above and other aspects, features and advantages of the present invention will be more apparent from the following detailed description taken with reference to the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention are described in detail with reference to the annexed drawings. In the following description, detailed descriptions of known functions and configurations incorporated herein are omitted for conciseness and clarity.

Figure 1:
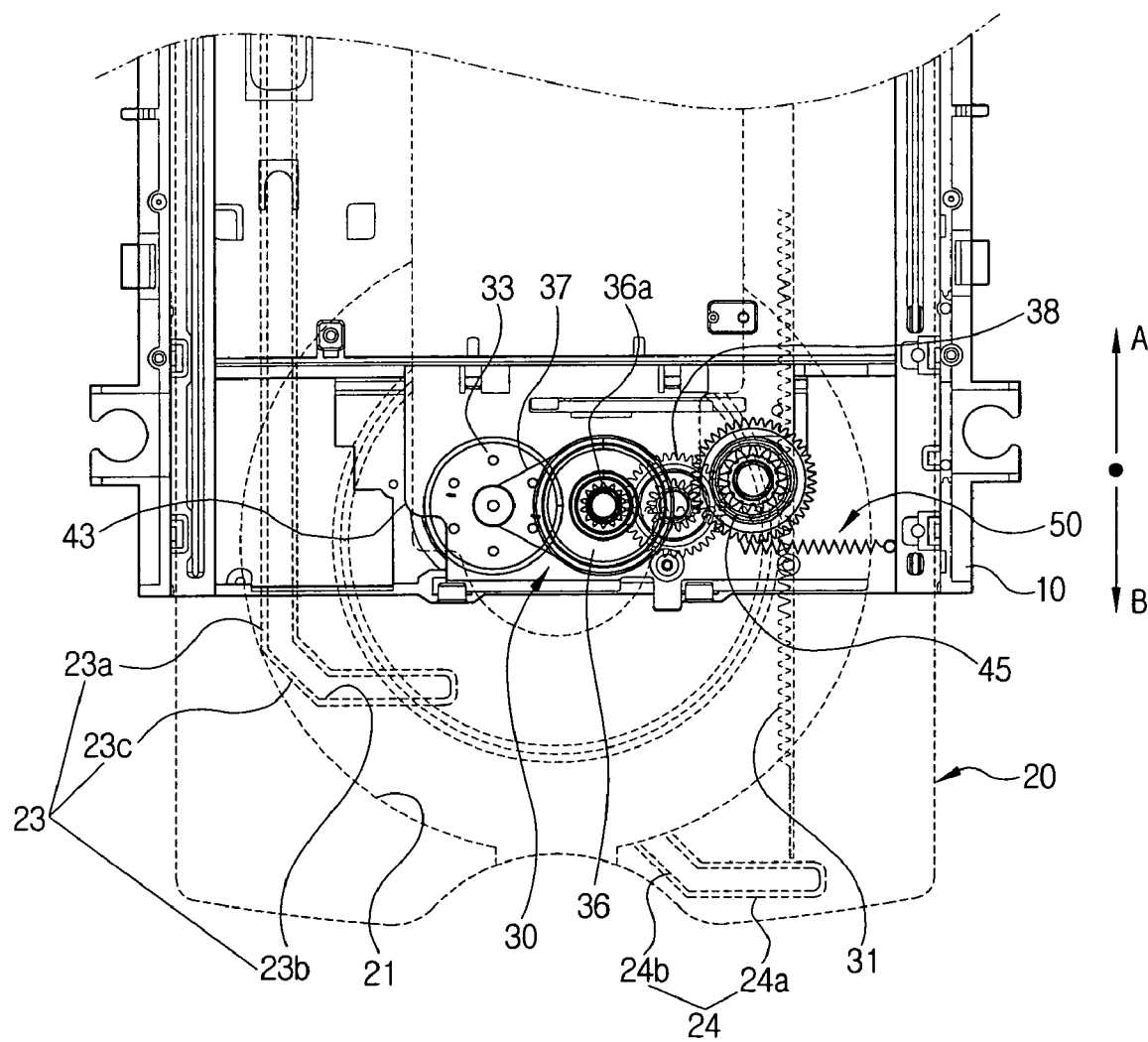
FIG. 1 is a top plan view of a disk player according to an exemplary embodiment of the present invention.
Figure 2:
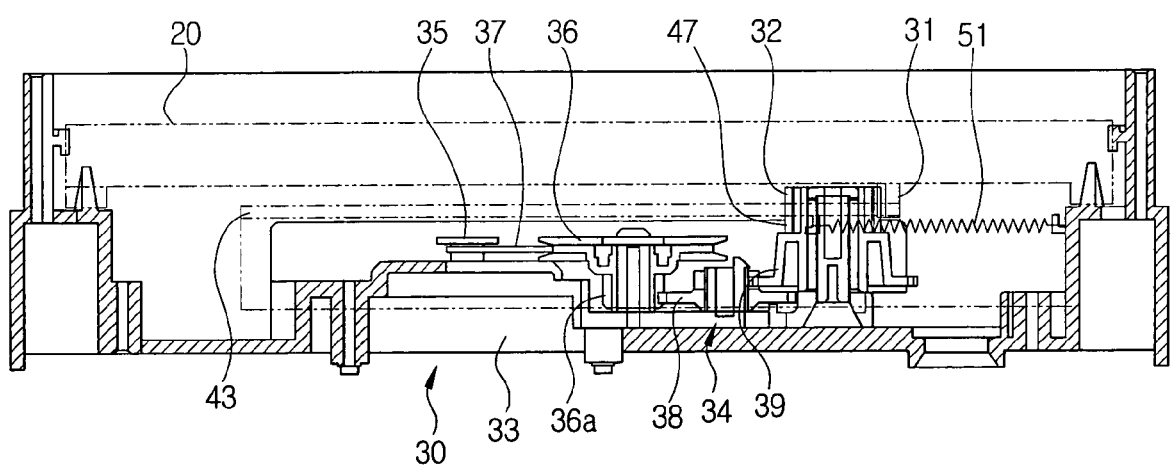
FIG. 2 is a transverse elevational view in partial cross section of a disk player according to an exemplary embodiment of the present invention.
Figure 3A:
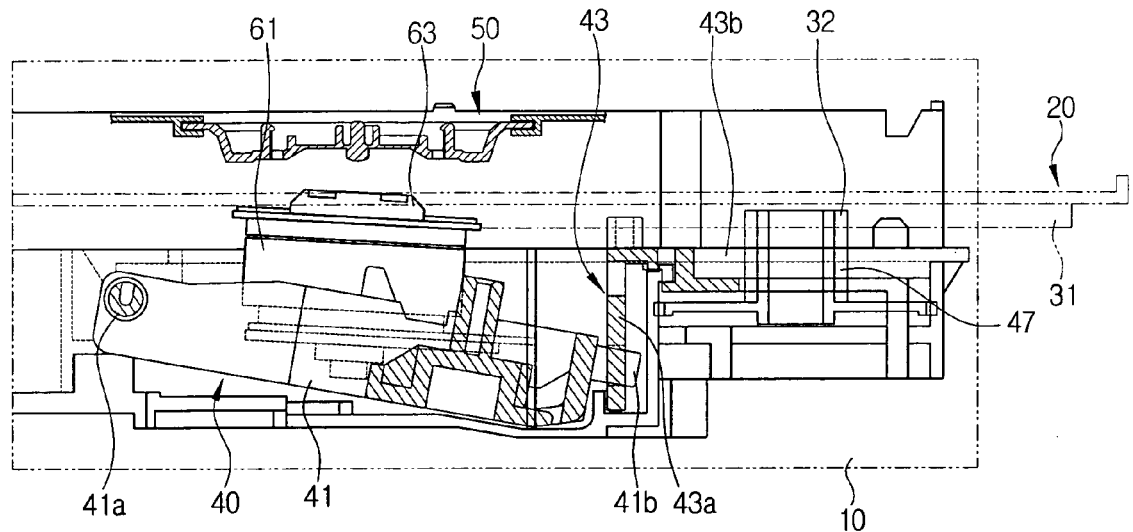
FIGS. 3A and 3B are transverse elevational views in partial cross section of a disk player according to an exemplary embodiment of the present invention.

Referring to FIGS. 1, 2, and 3A, a disk player according to an exemplary embodiment of the present invention includes a body 10, a tray 20 capable of loading and unloading in and out of the body 10, a driving unit 30 moving the tray 20, a spindle motor 61, a turntable 63, a lifting unit 40 raising the spindle motor 61 and the turntable 63, and a damping unit 50.

The tray 20 has a receiving part 21 for receiving a disk or a disk cartridge. The tray 20 moves in loading direction A and unloading direction B to move in and out of the body 10.

The driving unit 30 includes a first rack gear 31 of a certain length disposed at a lower portion of the tray 20, a tray gear 32 engaged with the first rack gear 31, and a driving motor 33.

The first rack gear 31 is preferably integrally formed with the tray 20. The tray gear 32 is rotatably formed in the body 10, and moves in association with the first rack gear 31 according to rotation directions to move the tray 20.

The driving motor 33 transmits power via the power transmission unit 34 to the tray gear 32, and rotates in both directions. The power transmission unit 34 includes a driving pulley 35 on a rotating axis of the driving motor 33, a driven pulley 36, a belt 37, and an idle gear 38. The belt 37 connects the driving pulley 35 and the driven pulley 36. A pulley gear 36a formed coaxially with the driven puller 36 is engaged with the idle gear 38. The power transmission unit 34 may be implemented with various examples.

Figure 3B:
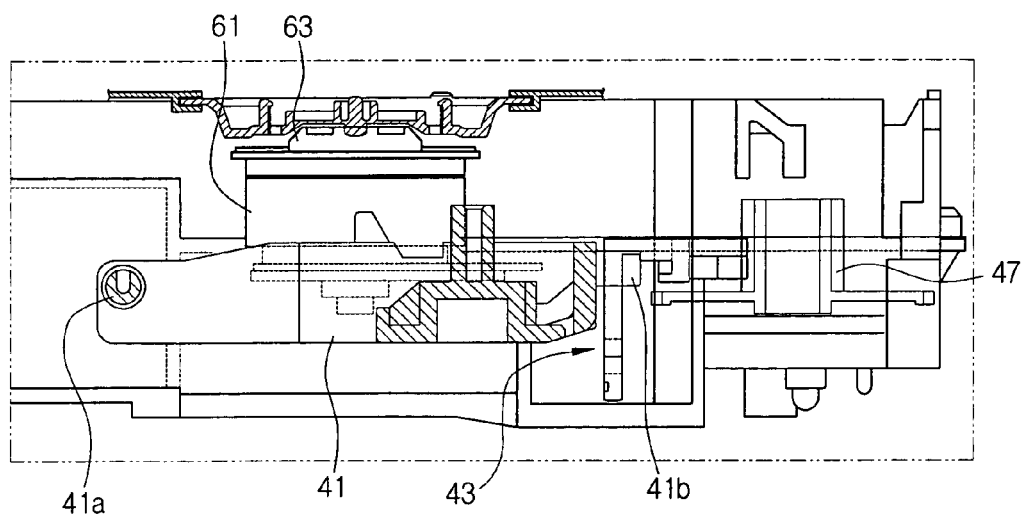
Figure 4A:
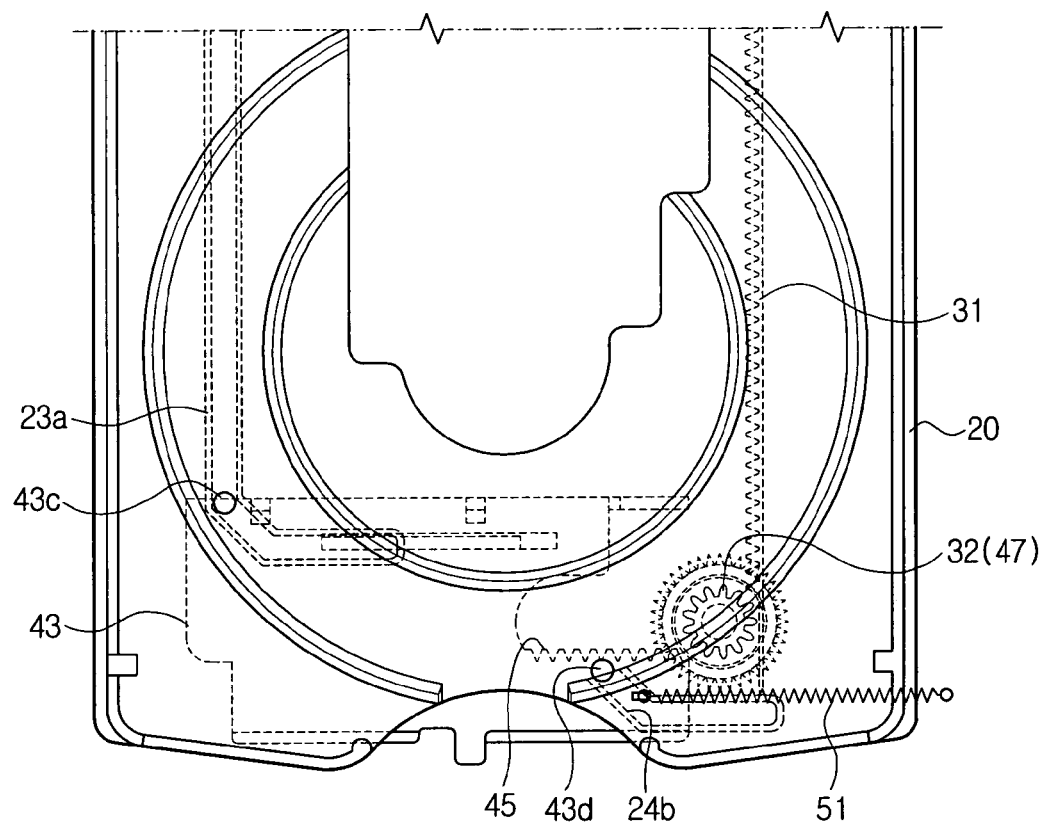
FIGS. 4A and 4B are schematic views illustrating the status of a cam slider when a tray is unloaded.

As shown in FIGS. 3A, 3B and 4A, the lifting unit 40 includes a pivot plate 41 pivotable up and down in the body 10, a cam slider 43 provided in the body 10 to reciprocally move in association with the pivot plate 41, a second rack gear 45 engaged with the cam slider 43, and a driving gear 47 rotating by power supplied by the driving motor 33 and selectively engaged with the second rack gear 45.

The pivot plate 41 includes a spindle motor 61 and an optical pick-up (not shown). The spindle motor 61 pivotably supports a turntable 63 receiving a disk loaded by the tray 20. A hinge 41a rotatably supports an end of the pivot plate 41 in the body 10. A plurality of cam protrusions 41b are formed at the other end of the pivot plate 41 that engage the cam slider 43.

Figure 4B:
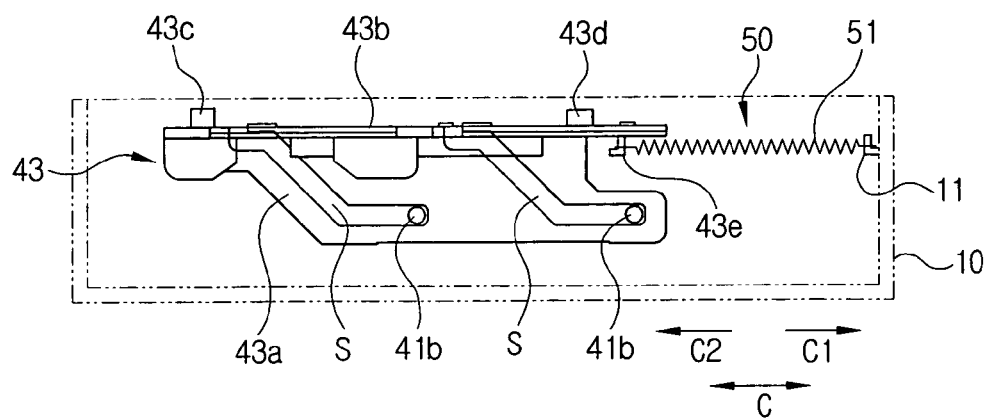

The cam slider 43 is reciprocably formed in a direction C substantially perpendicular to a moving direction of the tray 20 in the body 10, that is, substantially perpendicular to the directions A and B indicated by the arrows in FIG. 1. As shown in FIGS. 4A and 4B, the cam slider 43 includes a vertical wall 43a with a plurality of cam slits S engaged with the cam protrusion 41b and a horizontal wall 43b substantially perpendicular to the vertical wall 43a. The pair of cam slits S take on the same configuration of sloping upwardly or downwardly. As the cam slider 42 moves in the direction C, the cam protrusions 41b move relatively along the cam slits S so that the pivot plate 41 ascends and descends. A plurality of interference protrusions 43c and 43d protrude from a top surface of the horizontal wall 43b. The interference protrusions 43c and 43d are formed in each position to interfere with cam rails 23 and 24 at a bottom surface of the tray 20.

The cam rail 23 includes a first rail portion 23a substantially parallel with directions of loading and unloading A and B, a second rail portion 23b in a direction substantially perpendicular to the first rail 23a, and a slope rail 23c connecting the two rails 23a and 23b and inclining with respect to the two rails 23a and 23b.

Another cam rail 24 includes a rail portion 24a substantially parallel with the second rail 23b, and a slope rail 24b. The interference protrusions 43c and 43d are guided by each of the slope rails 23c and 24b such that the second rack gear 45 and the driving gear 47 may be engaged and disengaged.

The second rack gear 45 is formed integrally with the horizontal wall 43b by a certain length. The second rack gear 45 moves in engagement with the driving gear 47 or stops in disengagement therefrom as the cam slider 43 moves under the interference with the movement of the tray 20.

The driving gear 47 may be formed coaxially or integrally with the tray gear 32. The driving gear 47 may have a gear ratio substantially similar to that of the tray gear 32.

Figure 5A:
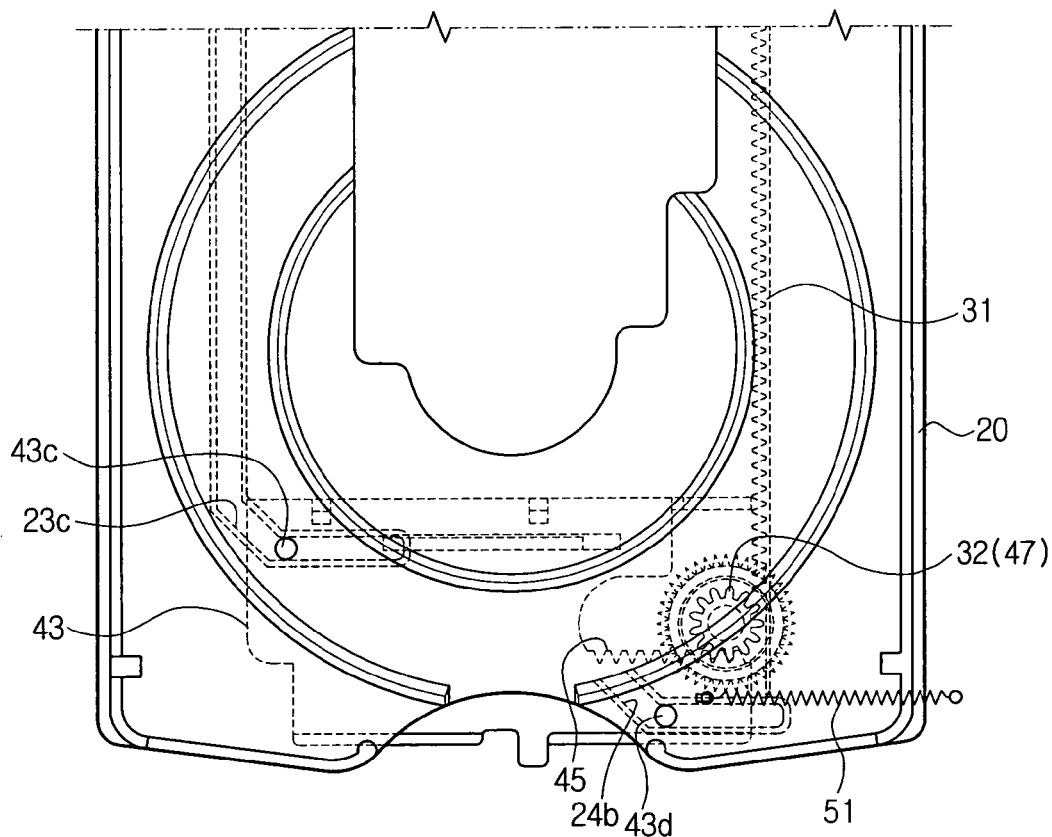
FIGS. 5A and 5B are views of the status of the second rack gear engaged with the driving gear as a tray is moved to a loading position by a certain distance.
Figure 5B:
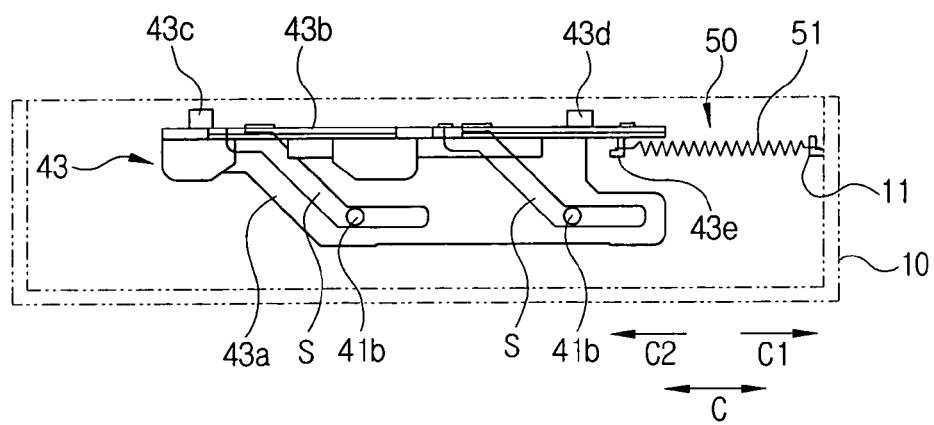

The damping unit 50 may include an elastic member 51 elastically urging the cam slider 43 in a direction indicated by arrow C1 in FIGS. 4B and 5B. The elastic member 51 may be a coiled tension spring. As shown in FIG. 4B, a first end of the elastic member 51 is connected with a locking protrusion 11 in the body 10. A second end of the elastic member 51 is connected with a locking protrusion 43e at a bottom surface of the horizontal wall 43b of the cam slider 43.

As the cam slider 43 moves in the C1 direction to raise the pivot plate 41, a load exerted on the driving motor 31 is reduced due to elastic restoration of the elastic member 51. As the cam slider 43 moves in the C2 direction to lower the pivot plate 41, quick movement and collision of the cam slider 43 is substantially prevented due to tension of the elastic member 51. The elastic member 51 functions as a damper, which reduces impacts caused by gravity of the pivot plate 41.

In the disk player with the above structure, operations of the cam slider 43, when the tray 20 is loaded and unloaded, are explained in detail with reference to FIGS. 4A to 6B.

FIGS. 4A and 4B are views of the position of the tray 20 before being loaded. The cam protrusions 41b of the pivot plate 41 are located at a lower portion of the cam slit S. The second rack gear 45 is not engaged with the driving gear 47. Under this circumstance, a disk on the tray 20 moves in the A direction during loading. As shown in FIGS. 5A and 5B, the interference protrusions 43c and 43d of the cam slider 43 are guided by the rail portions 23c and 24b to move in the direction C1. Accordingly, the second rack gear 45 is engaged with the driving gear 47 such that the cam slider 43 moves in the direction C1 by power of the driving motor 33.

Figure 6A:
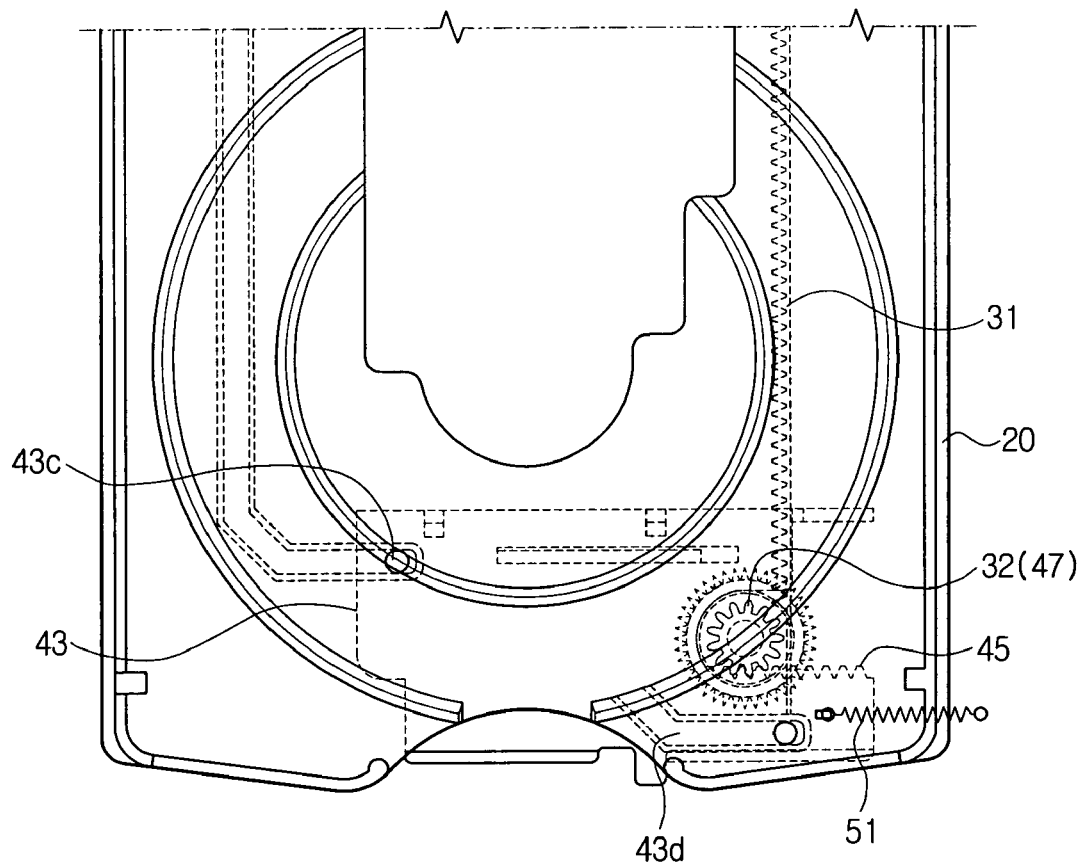
FIGS. 6A and 6B are views of the status of the second rack gear when the loaded tray is completely moved to one side with the cam slider.
Figure 6B:
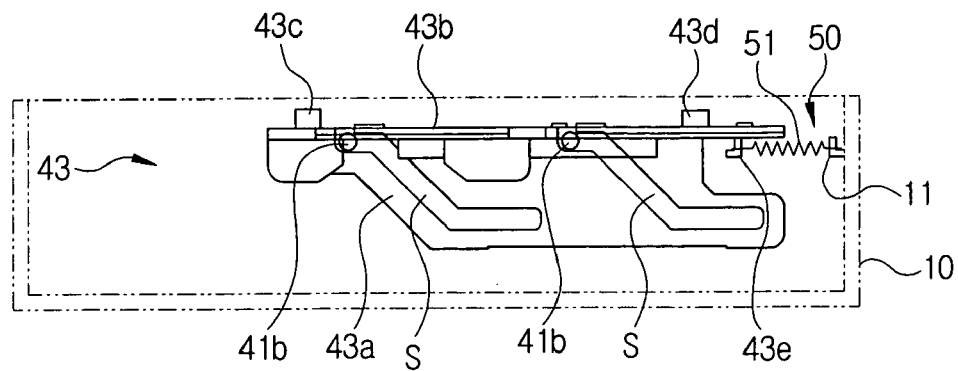

As shown in FIGS. 6A and 6B, the cam slider 43 moves in the direction C1. A cam pin 41b of the pivot plate 41 is guided along the slope of the cam slit S to ascend. At this time, a large load may be exerted on the driving motor 33 due to gravity applied on the pivot plate 41. However, according to an exemplary embodiment, the elastic member 51 elastically urges, or pulls, the cam slider 43 in the direction C1 such that the cam slider 43 may be easily moved.

When unloading the tray 20, the members 41 and 43 operate substantially oppositely to the aforementioned operations. Accordingly, the cam slider 43 moves again in the direction C2 so that the cam pin 41b descends along the cam slit S and the pivot plate 41 descends. As the elastic member 51 pulls the cam slider 43 in the direction C1, quick movement of the cam slider 43 is substantially prevented due to the weight of the pivot plate 41. Accordingly, the cam slider 43 is prevented from colliding with the other members when returning, such that noise or damage may be suppressed.

As described above, the disk player according to exemplary embodiments of the present invention includes a damping unit urging the cam slider 43 to one side so that the driving load may be reduced for moving the cam slider 43 to raise the pivot plate 41.

Additionally, the damping unit may suppress the quick returning of the cam slider 41 due to the weight of the pivot plate 41 when the cam slider 43 is moved to lower the pivot plate 41. Therefore, noise or damage by collision may be reduced.

While the invention has been shown and described with reference to certain embodiments thereof, it will be understood by those skilled in the art that various changes in form and details may be made therein without departing from the spirit and scope of the invention as defined by the appended claims.

What is claimed is:

1. A disk player, comprising:
   a tray capable of moving in and out of a player body;
   a driving unit moving the tray, the driving unit including
      a first rack gear formed at a lower portion of the tray;
      a tray gear rotatably formed in the player body to engage the first rack gear; and
      a driving motor for driving the tray gear;
   a lifting unit selectively engaged with or disengaged from the driving unit that raises a turntable receiving a disk loaded by the tray thereon and a spindle motor rotating the turntable, the lifting unit including
      a pivot plate that supports the spindle motor and the turntable and is rotatably formed in the player body;
      a cam slider provided in the player body for reciprocal sliding movement that causes the pivot plate to ascend or descend according to a direction of movement of the cam slider;
      a driving gear formed in the player body rotated by power supplied by the driving motor; and
      a second rack gear formed in the cam slider engaged with and disengaged from the driving gear according to the position of the cam slider; and
   a damping unit that reduces loads and impacts during movement of the lifting unit.

2. The disk player according to claim 1, wherein
the cam slider moves in association with the tray so that the second rack gear and the driving gear are engaged with and disengaged from each other.

3. The disk player according to claim 2, wherein
the cam slider has at a top surface an interference protrusion; and
the tray has a cam rail for guiding the interference protrusion.

4. The disk player according to claim 1, wherein
the pivot plate has one or more cam protrusions; and
the cam slider has a cam slit that receives and guides the cam protrusions.

5. The disk player according to claim 1, wherein
the tray gear and the driving gear are coaxially formed.

6. The disk player according to claim 1, wherein
the damping unit has an elastic member connected with the lifting unit.

7. The disk player according to claim 6, wherein
the elastic member connects the lifting unit and the player body to provide the lifting unit with an elastic support in the raising direction and a reaction force during descending of the lifting unit.

8. The disk player according to claim 1, wherein
the damping unit includes an elastic member urging the cam slider in a moving direction of the cam slider corresponding to a raising direction of the pivot plate.

9. The disk player according to claim 8, wherein
the elastic member is a coiled spring.

* * * * *